(12) United States Patent
Park et al.

(10) Patent No.: US 10,809,382 B2
(45) Date of Patent: Oct. 20, 2020

(54) TRANSMITTING GPS CORRECTION DATA THROUGH EMERGENCY ALERT SYSTEM

(71) Applicant: KT Corporation, Gyeonggi-do (KR)

(72) Inventors: Sang Woo Park, Seoul (KR); Kyeong Min Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 254 days.

(21) Appl. No.: 15/959,466

(22) Filed: Apr. 23, 2018

(65) Prior Publication Data
US 2018/0306929 A1    Oct. 25, 2018

(30) Foreign Application Priority Data
Apr. 21, 2017   (KR) .......................... 10-2017-0051450

(51) Int. Cl.
| | |
|---|---|
| *G01S 19/07* | (2010.01) |
| *H04W 4/021* | (2018.01) |
| *H04W 4/06* | (2009.01) |
| *H04W 4/90* | (2018.01) |

(52) U.S. Cl.
CPC ............ *G01S 19/07* (2013.01); *H04W 4/021* (2013.01); *H04W 4/06* (2013.01); *H04W 4/90* (2018.02)

(58) Field of Classification Search
CPC .......... G01S 19/07; G01S 19/41; G01S 19/20; G01S 19/08; G01S 5/009; H04W 4/021; H04W 4/06
USPC .................................................. 342/357.44
See application file for complete search history.

(56) References Cited

U.S. PATENT DOCUMENTS

| | | | |
|---|---|---|---|
| 9,541,648 B2 | 1/2017 | Ralphs et al. | |
| 2007/0055445 A1* | 3/2007 | Janky ....................... | H04K 1/00 |
| | | | 701/486 |
| 2008/0088506 A1* | 4/2008 | Fischer ................... | G01S 19/05 |
| | | | 342/357.42 |
| 2013/0223626 A1 | 8/2013 | Edge et al. | |
| 2013/0225185 A1 | 8/2013 | Edge et al. | |

(Continued)

FOREIGN PATENT DOCUMENTS

| | | |
|---|---|---|
| JP | 3889418 B2 | 3/2007 |
| KR | 10-1392027 B1 | 5/2014 |
| KR | 10-2015-0119487 A | 10/2015 |

OTHER PUBLICATIONS

Gidon Lissai, "Assisted GPS solution in cellular networks", Thesis/Dissertation Collections, Rochester Institute of Technology, Nov. 2006.

(Continued)

*Primary Examiner* — Harry K Liu
(74) *Attorney, Agent, or Firm* — IP Legal Services, LLC

(57) ABSTRACT

A GPS correction data may be provided to user devices through one of a unicast mode and a broadcast mode using a mobile communication network. For transmitting the GPS correction data to a user device through a mobile communication network, the apparatus may include a receiver configured to receive a GPS correction data and store in a memory, at least one processor configured to decide a transmission mode from a unicast mode and a broadcast mode for transmitting the GPS correction data to a user device, and a transmitter configured to transmit the GPS correction data to the user device using the decided transmission mode through the mobile communication network.

17 Claims, 9 Drawing Sheets

(56) References Cited

U.S. PATENT DOCUMENTS

2013/0252630 A1 9/2013 Edge et al.
2016/0029162 A1 1/2016 Edge et al.

OTHER PUBLICATIONS

GSMA, "Network 2020: The 4G Broadcasting Opportunity".

* cited by examiner

TRANSMITTING GPS CORRECTION DATA THROUGH EMERGENCY ALERT SYSTEM

CROSS REFERENCE TO PRIOR APPLICATIONS

The present application claims priority under 35 U.S.C. § 119 to Korean Patent Application No. 10-2017-0051450 (filed on Apr. 21, 2017).

BACKGROUND

The present disclosure relates to transmitting global positioning system (GPS) correction data and, more particularly, to transmitting GPS correction data to a user device using a mobile communication network.

A typical GPS technology causes errors in a location accuracy in a range from several meters to several tens meters due to various causes. To correct such the error in the location accuracy, various GPS correction technologies have been introduced, such as Differential Global Positioning Systems (DGPS), a real-time kinematic (RTK) technology, a Network RTK technology, or a precise point positioning (PPP)-RTK technology. The GPS correction technology introduced GPS correction data that is broadcasted with GPS signals through a predetermined frequency signal to a device. For example, such GPS correction data may be broadcasted through an AM broadcasting signal, a FM broadcasting signal, or a digital multimedia broadcasting (DMB) signal.

SUMMARY

In accordance with an aspect of the present embodiment, a GPS correction data may be transmitted through a mobile communication network to a user device without consuming excessive network resources.

In accordance with another aspect of the present embodiment, a GPS correction data may be unicasted to a user device through a packet data network gateway or broadcasted to user devices through an emergency alert system (EAS) according to predetermined conditions.

In accordance with still another aspect of the present embodiment, a transmission mode of transmitting GPS correction data may be dynamically switched from a unicast mode to a broadcast mode or from a broadcast mode to a unicast mode according to predetermined environmental factors.

In accordance with yet another aspect of the present embodiment, a GPS correction data may be stably provided to user devices through a wireless network.

In accordance with one embodiment, an apparatus may be provided for transmitting a global positioning system (GPS) correction data to a user device through a mobile communication network. The apparatus may include a receiver configured to receive a GPS correction data and store in a memory, at least one processor configured to decide a transmission mode from a unicast mode and a broadcast mode for transmitting the GPS correction data to a user device, and a transmitter configured to transmit the GPS correction data to the user device using the decided transmission mode through the mobile communication network.

The receiver may be configured to i) receive reference region information related to the GPS correction data, where the reference region information is information on a reference region of the GPS correction data and ii) receive network device information related to the reference region information and store the received network device information in the device.

The at least one processor may be configured to a) link the received reference region information with the received network device information and store the linking result in the memory as a form of a mapping table and b) determine a target transmission region to transmit the GPS correction information using the liking results.

The at least one processor may be configured to identify a region having network devices having a network load smaller than a predetermined threshold and select the unicast mode as the transmission mode for transmitting the GPS correction data to user devices in the identified region.

The at least one processor may be configured to insert a unicast switching parameter in a broadcasting message transmitted to the user devices of the identified region having the network load smaller than the predetermined threshold.

The at least one processor may be configured to i) group the user devices in the identified region having the network load smaller than the predetermined threshold into a predetermined number of user device groups and ii) transmit a unicast switching request to user devices of each user device group by turn with a predetermined interval.

The at least one processor may be configured to switch a transmission mode for transmitting a GPS correction data from a unicast mode to a broadcast mode when the network load is greater than the predetermined threshold.

The at least one processor may be configured to switch a unicast mode to a broadcast mode for transmitting a GPS correction data when a predetermined time has passed after unicasting the GPS correction data to a user device that initially accesses the apparatus for requesting the GPS correction data.

The at least one processor may be configured to select a unicast mode as a transmission mode for transmitting a GPS correction data upon receiving a request for transmitting an emergency alert message, the emergence alert message, a target region, and a transmission time from an emergency alert system.

The at least one processor may be configured to select a unicast mode as a transmission mode for a GPS correction data when the transmission time is greater than a predetermined threshold.

The at least one processor may be configured to transmit a unicast switching request including an expiration time to user devices decided to be switched from a broadcast mode to a unicast mode as a transmission mode for transmitting a GPS correction data.

The at least one processor may be configured to insert a unicast switching parameter having an expiration time into a broadcasting message transmitted to user devices decided to be switched from a broadcast mode to a unicast mode as a transmission mode for transmitting a GPS correction data.

In accordance with another embodiment, a method may be provided for transmitting a global positioning system (GPS) correction data to a user device through a mobile communication network. The method may include receiving a GPS correction data and storing the received GPS correction data in a memory; deciding a transmission mode from a unicast mode and a broadcast mode for transmitting the GPS correction data to a user device; and transmitting the GPS correction data to the user device using the decided transmission mode through the mobile communication network.

The method may further include receiving reference region information related to the GPS correction data, where the reference region information is information on a reference region of the GPS correction data; receiving network device information related to the reference region information and storing the received network device information in the device; mapping the received reference region information with the received network device information and storing the mapping result in the memory as a form of a mapping table; and determining a target transmission region to transmit the GPS correction information using the liking results.

The deciding a transmission mode may include identifying a region having network devices having a network load smaller than a predetermined threshold; and selecting the unicast mode as the transmission mode for transmitting the GPS correction data to user devices in the identified region.

The method may further include inserting a unicast switching parameter in a broadcasting message transmitted to the user devices of the identified region having the network load smaller than the predetermined threshold.

The method may further include grouping the user devices in the identified region having the network load smaller than the predetermined threshold into a predetermined number of user device groups; and transmitting a unicast switching request to user devices of each user device group by turn with a predetermined interval.

The method may further include switching a transmission mode for transmitting a GPS correction data from a unicast mode to a broadcast mode when the network load is greater than the predetermined threshold.

The deciding may include switching a unicast mode to a broadcast mode for transmitting a GPS correction data when a predetermined time has passed after unicasting the GPS correction data to a user device that initially accesses the apparatus for requesting the GPS correction data.

The deciding may include selecting a unicast mode as a transmission mode for transmitting a GPS correction data upon receiving a request for transmitting an emergency alert message, the emergence alert message, a target region, and a transmission time from an emergency alert system.

The deciding may include selecting a unicast mode as a transmission mode for a GPS correction data when the transmission time is greater than a predetermined threshold.

The method may further include transmitting a unicast switching request including an expiration time to user devices decided to be switched from a broadcast mode to a unicast mode as a transmission mode for transmitting a GPS correction data.

The method may further include inserting a unicast switching parameter having an expiration time into a broadcasting message transmitted to user devices decided to be switched from a broadcast mode to a unicast mode as a transmission mode for transmitting a GPS correction data.

In accordance with still another embodiment, a server may be provided for transmitting a global positioning system (GPS) correction data to a user device through a mobile communication network. The server may include a receiver configured to receive a request for a GPS correction data from the user device, at least one processor configured to decide a transmission mode from a unicast mode and a broadcast mode for transmitting the GPS correction data to the user device, and a transmitter configured to transmit the GPS correction data to the user device using the decided transmission mode through the mobile communication network.

When the broadcast mode is decided as the transmission mode for transmitting the GPS correction data, the at least one process may be configured to transmit the GPS correction data to the user device using an emergency alert message through an emergency alert system dedicated channel.

The at least one processor is configured to transmit the GPS correction data to a broadcasting center and set an identification bit of an emergency alert message to a predetermined value indicating GPS correction data transmission when the broadcast mode is decided as the transmission mode. In this case, the broadcasting center may be configured to include the GPS correction data and the identification bit into an emergency alert message and transmit the emergency alert message to the user device through an emergency alert system dedicated channel.

The broadcasting center may be one of a cell broadcasting message center (CBMC) and a broadcast/multicast service center (BMSC).

The at least one processor may be configured to perform authentication on the user device based on registration information and user device information.

The at least one processor may be configured to transmit a decoding key to the user device when the authentication of the user device is passed.

The at least one processor may be configured to transmit the requested correction data to the user device using a unicast network for a predetermined time.

In accordance with yet another embodiment, a user device may be provided for receiving a global positioning system (GPS) correction data from a service server through a mobile communication network. The user device may include a transmitter configured to transmit a request for the GPS correction data to the service server, at least one processor configured to determine whether a received data is the GPS correction data received through a unicast network or an emergency alert message received through a broadcast network upon receipt of the data, and a receiver configured to receive a decoding key from the service server when the authentication is passed, receive the GPS correction data from the service server through one of the unicast network and the broadcast network.

When the received data is the emergency alert message through the broadcast network, the at least one processor may be configured to determine whether an identification bit indicates GPD correction data transmission or Emergency alert message transmission.

When the identification bit indicates GPS correction data transmission, the at least one processor may be configured to extract data from the emergency alert message, decode the extracted data using a decoding key value, and use the decoded data as the GPS correction data.

DETAILED DESCRIPTION OF EMBODIMENTS

In accordance with at least one embodiment, a GPS correction data may be transmitted to a user device using a mobile communication network without generating excessive delay and without consuming a large amount of network resources. Particularly, GPS correction data may broadcast to a user device through an emergency alert system (EAS) according to predetermined environment factors. In accordance with another embodiment, a transmission mode of transmitting GPS correction data may be dynamically switched from a unicast mode to a broadcast mode or from a broadcast mode to a unicast mode according to predetermined environmental factors.

For providing such a GPS correction data to a user device, a GPS data service system may be used. Such a GPS data service system will be described in more detail with reference to FIG. 1.

Figure 1:
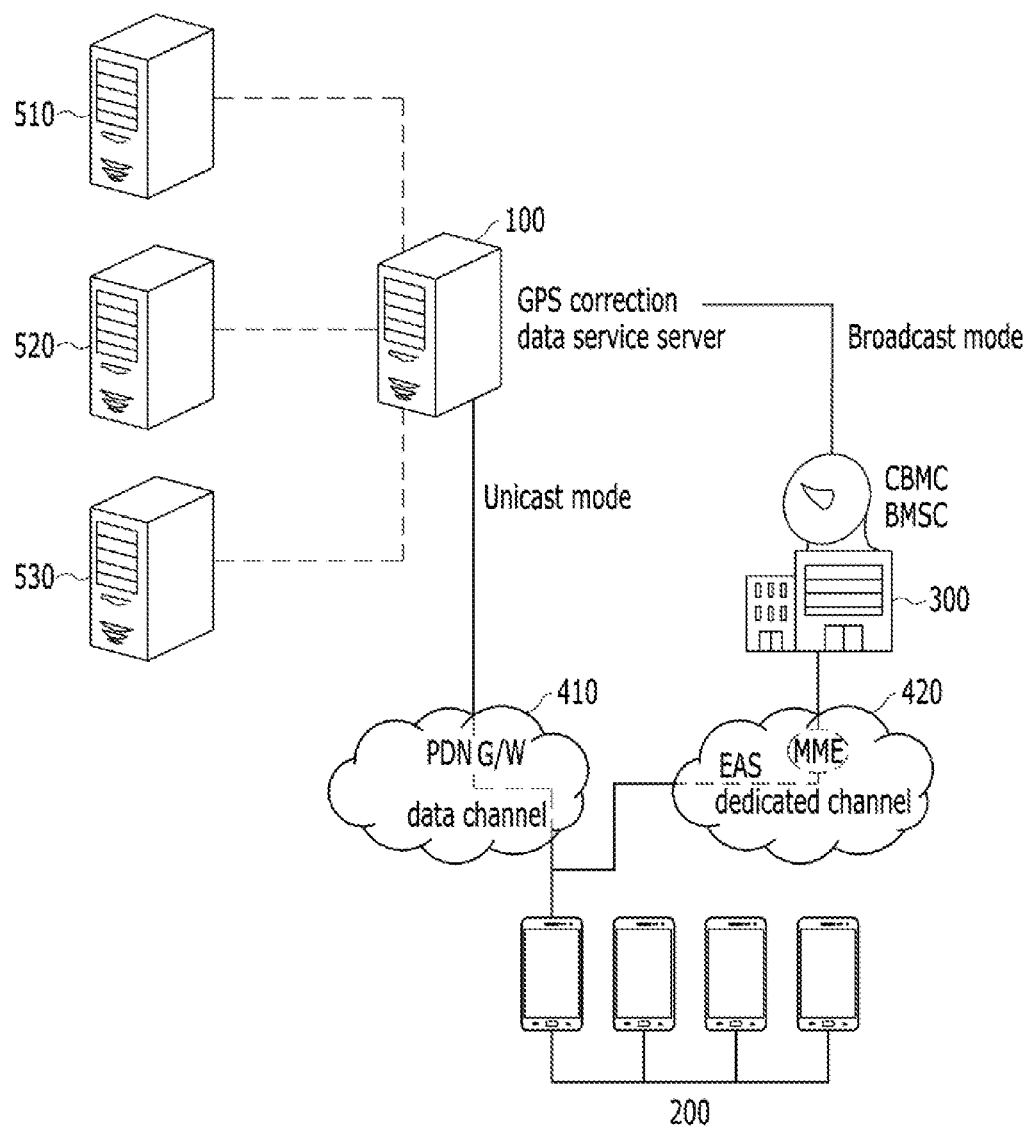
FIG. 1 illustrates a GPS data service system for providing GPS correction data in accordance with at least one embodiment of the present disclosure.

FIG. 1 illustrates a GPS data service system for providing GPS correction data in accordance with at least one embodiment of the present disclosure.

Referring to FIG. 1, a GPS data service system may include a GPS correction data service server 100, at least one user device 200, at least one broadcasting center 300, unicast network 410, and broadcast network 420 in accordance with at least one embodiment. The GPS data service system may further include GPS data server 510, monitoring server 520, and information server 530, which may be electrically connected to GPS correction data service server 100 and provide a GPS data, a GPS correction data, monitoring results, region information, and supplementary information to GPS correction data service server 100. For convenience and ease of understanding, GPS correction data service server 100, GPS data server 510, monitoring server 520, and information server 530 are illustrated in FIG. 1 as separated and independent servers or computing systems. However, the embodiments are not limited thereto. For example, GPS correction data service server 100, GPS correction data generating server 510, monitoring server 520, and information server 530 may be implemented as one independent server or a computer in accordance with another embodiment.

GPS correction data service server 100 may be a server (e.g., a computer of a group of computers interconnected each other) that manages and controls operations for providing GPS correction data to user devices using a mobile communication network without incurring excessive delay and without consuming a large amount of network resources in accordance with at least one embodiment. Furthermore, GPS correction data service server 100 may decide a transmission mode between a unicast mode and a broadcast mode according to predetermined factors in accordance with at least one embodiment. In case for the broadcast mode, GPS correction data service server 100 may transmit a GPS correction data to a user device through an emergency alert system: EAS (e.g., EAS dedicated channel) which is defined, introduced, and established for transmitting emergency alert messages by world-wide standard organization.

GPS correction data service server 100 may receive a GPS data, a GPS correction data, monitoring results, regional information (e.g., location information or geographical information), and supplementary information from other servers, such as GPS data server 510, monitoring device 520, and information server 530.

GPS data server 510 may be a server that collects GPS data (e.g., GPS information) from at least one of GPS reference stations (e.g., GPS stations) or directly from at least one satellite and generate a GPS correction data based on the collected GPS data. GPS data generating server 510 may include a device that monitors system states of GPS stations (e.g., satellite).

In particular, GPS data server 510 may generate GPS correction data and information on a reference region of the generated GPS correction data (reference region information) and transmit the GPS correction data and the reference region information to GPS correction data service server 100. The reference region information may be information on a region (e.g., location) where the generated GPS correction data is valid. (e.g., where the GPS correction data may be used or where the GPS correction data may be related to).

Monitoring device 520 may monitor predetermined network entities (e.g., wireless and/or wired network equipment including base stations). The network entities may include a wireless network device, such as a wireless access point (e.g., Wi-Fi router) and a wired network device, such as a L2 switch, a L3 switch, and modulation and demodulation (MODEM) as wired network entities.

For the wireless network device, monitoring device 520 may collect i) base station information, such as eNB ID, Tracking Area Code (TAC), location information (e.g., latitude/longitude coordinate), ii) User identification information (e.g., IMSI) of a user device linked to a base station, and iii) load information (e.g., processing amount of traffic) of the base station. For the wired network device, monitoring device 520 may collect i) location information of an access device (e.g., latitude/longitude coordinate, administrative district), ii) identification information (e.g., IP address MAC address), and iii) identification information of a user device linked to the access device (e.g., IP address and MAC address)

Information server 530 may store geographical data including information on latitude, longitude, a coordinate, and an administrative district. Such a geographical data may be referred to as map data.

GPS correction data service server 100 may receive GPS correction data from GPS data server 510, regional information (e.g., location information) from information server 530, and monitoring results from monitoring device 520 in accordance with at least one embodiment. Embodiments are not limited thereto. For example, GPS correction data service server 100 may generate a GPS correction data using information received from at least one of GPS data server 510, monitoring device 520, and information server in accordance with another embodiment.

GPS correction data service server 100 may analyze the received information and determine a predetermined region for providing a service, network devices (e.g., access devices) installed at the predetermined region, user devices serviced by (e.g., linked to or accessed to) the network devices in the predetermined region based on the received regional information and the received monitoring results. Based on the analysis result and the determination result, GPS correction data service server 100 may select a transmission mode for transmitting a GPS correction data from a unicast mode and a broadcast mode and transmit the GPS correction data to user devices using the decided transmission mode in accordance with at least one embodiment. For example, when the unicast mode is selected, GPS correction data service server 100 may transmit the GPS correction data to a user device through a data channel of unicast network 410. When the broadcast mode is selected, GPS correction data service server 100 may transmit the GPS correction data to a user device through an emergency alert system (EAS) dedicated channel of a broadcast network 420.

In accordance with another embodiment, when the broadcast mode is selected, GPS correction data service server 100 may broadcast a GPS correction data to user devices i) using control resources or ii) using data resources. In case of using the control resources, GPS correction data service server 100 may transmit the GPS correction data through a cell broadcasting message center (CBMC). In case of using the data resources, GPS correction data service server 100 may transmit the GPS correction data through a broadcast/multicast service center (BMSC). When the unicast mode is selected, GPS correction data service server 100 may operate as a typical server to transmit data to user devices. For example, when the unicast mode is selected, GPS correction data service server 100 may transmit the GPS correction data through a packet data network gateway (PDN-GW) and a base station. Such operation of GPS correction data service server 100 will be described in more detail with reference to FIG. 2.

Broadcasting center 300 may be a server for broadcasting a message using a predetermined dedicated channel for special purpose. For example, broadcasting center 300 may be an emergency alert system (EAS) for broadcasting an emergency alert message (EAM) containing information for warning public of disasters, such as a flood, hurricane, war, extremely hot or cold weather, so forth. Such an EAS may be established by a worldwide standard organization and governments, and a predetermined channel of a mobile communication network is reserved and dedicatedly allocated to the EAS. The EAS uses the dedicated channel (e.g., EAS dedicated channel) to broadcast the EAM. In accordance with at least one embodiment, such EAS may be used to broadcast the GPS correction data to a user device. That is, when the broadcast mode is selected as the transmission mode, the GPS correction data may be included in the emergency alert message and transmitted to the user device through the EAS dedicated channel of broadcast network 420 in accordance with at least one embodiment.

Unicast network 410 and broadcast network 420 are a mobile communication network for transmitting a GPS correction data to user devices in a unicast mode and a broadcast mode. Particular, unicast network 410 may be used to unicast the GPS correction data to a user device through a data channel. In particular, unicast network 410 may be a network including a packet data network gateway (PDN-G/W) and a base station. In unicast network 410, the GPS correction data may be transmitted to user device through a data channel formed of a packet data network gateway and a base station Broadcast network 420 may be used to broadcast the GPS correction data to a user device through a dedicated channel allowed for the EAS. Broadcast network 410 may be an EAS network. Broadcast network 410 may be a network formed of a mobile management entity (MME) for broadcasting an emergency alert message through an EAS dedicated channel. For example, broadcast network 410 may be a predetermined dedicated channel formed of a cell broadcasting message center (CBMC) and a MME or a predetermined dedicated channel formed of a broadcast/multicast service center (BMSC).

As shown in FIG. 1, broadcasting center 300 may be a cell broadcasting center (CBMC) and a broadcast/multicast service center (BMSC) for broadcasting an emergency alert message through an EAS dedicated channel. For example, the CBMC may receive a GPS correction data from GPS correction data service server 100, deliver the GPS correction data to the MME and transmit the GPS correction data using a system information block (SIB). For another example, the BMSC receive GPS correction data from GPS correction data service server 100, encode the received GPS correction data, and transmit the encoded GPS correction data to a user device using a base station (e.g., eNodeB).

Figure 2:
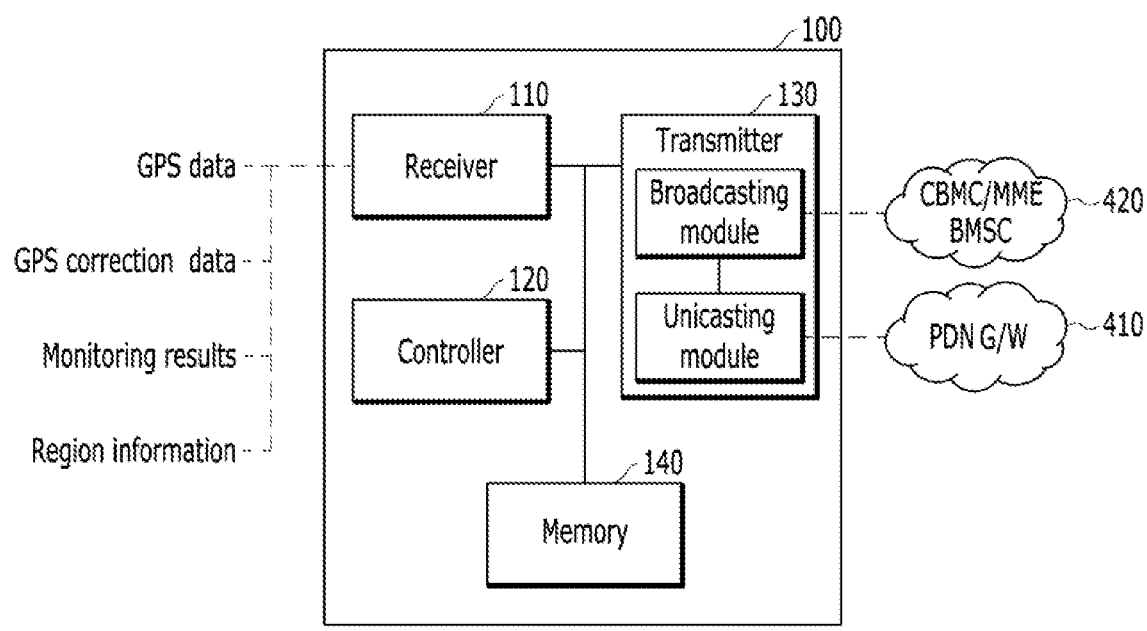
FIG. 2 illustrates a GPS correction data service server for providing GPS correction data in accordance with at least one embodiment of the present disclosure.

Hereinafter, such GPS data service server 100 will be described in more detail with reference to FIG. 2. FIG. 2 illustrates a GPS correction data service server for providing GPS correction data in accordance with at least one embodiment of the present disclosure.

Referring to FIG. 2, GPS correction data service server 100 may be a computing system capable of receiving digital data from other entities through a predetermined communication network, transmitting digital data to other entities through a predetermined communication network, processing the digital data by performing operations for providing GPS correction data to user devices 200 using one of a broadcast mode and a unicast mode by cooperating with other computing and communication systems, and storing digital data in a memory. As described, GPS correction data service server 100 may be implemented as single computing server or a group of computers each perform operations related to at least one of modules. GPS correction data service server 100 may include a communication circuit including receiver 110 and transmitter 130, at least one processor including controller 120, and memory 140 in accordance with at least one embodiment. Furthermore, GPS correction data service server 100 may include a memory, a memory controller, at least one processor (e.g., central processing unit: CPU), peripheral interfaces, input/output (I/O) subsystems, display device, an input device, and a communication circuit. The communication circuit may communicate with other entities including user devices 200 through a mobile communication network including unicast network 410 and broadcast network 420. The communication circuit may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX)

network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

The at least one processor including controller 120 may perform or control overall operation of GPS correction data service server 100. For example, controller 120 may be a central processing circuitry that controls constituent elements (e.g., memory, communication circuit, etc.) of GPS correction data service server 100 and/or performs a variety of operations (or functions) of GPS correction data service server 100.

Memory 140 may store a variety of information, such as software programs for operation, data received from other entities, and data generated as result of operations. That is, memory 140 may store an operation system data, applications, and related data, received from other entities through a variety of communication media (e.g., communication networks). Memory 140 may include at least one of an internal memory and an external memory according to embodiments. For example, memory 140 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Referring to FIG. 2, receiver 110 may receive GPS correction data and corresponding reference location information from GPS data server 510. The GPS correction data may be not received from GPS data server 510. Instead of receiving the GPS correction data, the GPS correction data may be generated using GPS data from GPS data server 510 by controller 120 of GPS correction data service server 100 in accordance with another embodiment. The reference location information may be information on a location where the GPS correction data is valid (e.g., a location where the GPS correction data can be used). For example, the reference location information may be information indicating an area within a predetermined-distance radius from a certain point. Furthermore, the reference location information may be an administrative distinct or a local area information. The embodiments are not limited thereto.

Receiver 110 may collect information on network devices (e.g., access devices) and user devices accessing the network devices in connection with wireless network devices, wired network devices, and/or monitoring device 520.

In case of wireless network devices (e.g., eNB of LTE), receiver 110 may collect i) base station information, such as eNB ID, tracking area code (TAC), and location information (e.g., longitude/latitude, administrative district) and ii) user device information such as user device identification (e.g. international mobile subscriber identity: IMSI) and store the collected information in memory 140 in a form of mapping relation. In case of wired network devices, receiver 110 may collect i) wired network device information, such Identification information (e.g., medium access control:MAC address, internal protocol: IP address) and location information (e.g., longitude latitude, administrative district) and ii) user device information of user device accessing the wired network device, such as user device identification (e.g. MAC address and IP address) and store the collected information in memory 140 in a form of mapping relation.

Controller 120 may perform operations for mapping network device information and region information (e.g., longitude/latitude coordinate and administrative district) using the network device information (e.g., including a network device location) and the region information received from information server 530. Controller 120 may store mapping results in memory 140 as a form of a mapping table. That is, controller 120 may determine network devices matched with a predetermined region based on the network device information and the region information. The stored network device information may include an ID, a TAC, a MME, or an IP address. The stored information may also include information on user devices that access or link to the network devices. Based on the mapping information stored in memory 140, it is possible to identify i) locations where network devices are installed, ii) types of network devices, and iii) user devices that have accessed to network devices.

Controller 120 may perform operations for determining a target area to transmit a GPS correction data based on i) reference location information of a GPS correction data, received through receiver 110, ii) information on regions mapped to the GPS correction data (e.g., region information), and iii) network device information. Controller 120 may store the determined target area at memory 140. Accordingly, memory 140 may store a GPS correction data and a corresponding target area by each reference location information.

Controller 120 may extract data to be transmitted to user devices by parsing the GPS correction data. Further, controller 120 may set a transmission period differently according to a transmission mode. Controller 120 may store information on a GPS correction data, a target area of the GPS correction data, and a transmission period of the GPS correction data at memory 140 by each reference location.

Controller 120 may perform operations for selecting one of a broadcast mode and a unicast mode as a transmission mode of a GPS correction data based on information stored in memory 140 in accordance with at least one embodiment. For example, controller 120 may i) determine the broadcast mode as a default transmission mode to transmit a GPS correction data, ii) switch the transmission mode to the unicast mode according to a target area or according to a user device if it needs, and iii) switch back the transmission mode to the broadcast mode after a predetermined expiration timer passes. Controller 120 may record a transmission mode per a target area or a target user device at memory 140.

For another example, controller 120 may decide a unicast mode for a user device that initially accesses GPS correction data service server 100, as a transmission mode for transmitting the GPS correction data in accordance with at least one embodiment. In particular, a user device may access GPS correction data service server 100 due to the invocation of an application requiring the GPS correction data, such as a map application or a navigation application. If the GPS correction data is transmitted using the broadcast mode for the initially accessing user device, it might cause significant delay because of a broadcasting transmission period. That is, the initially accessing user device must wait for its broadcasting transmission period to receive the GPS correction data. Accordingly, in this case, the unicast mode for transmitting the GPS correction data may prevent such delay caused by the broadcast mode. In the unicast mode, the GPS correction data may be immediately and continuously transmitted to the initially accessing user device.

Controller 120 may perform operations for switching the unicast mode to the broadcast mode after transmitting the GPS correction data to the initially accessing user device through the unicast mode through transmitter 130 in accordance with at least one embodiment. Therefore, a user device may receive the GPS correction data in the unicast mode when the user device initially accesses GPS correction data service server 100. Then, the user device may receive the GPS correction data in the broadcast mode unless it requires transmitting the GPS correction data in the unicast mode.

Controller 120 may switch a transmission mode of a predetermined user device from the broadcast mode to the unicast mode for transmitting the GPS correction data. The unicast mode may be decided i) for authenticating the predetermined user device, ii) for transmitting an emergency alert message (EAM) to user devices in a certain region, iii) by a special request from the predetermined user device, iv) based on the number of user devices receiving a service at a specific area, and v) based on network load, such as amount of network traffic.

For authenticating the predetermined user device, controller 120 may insert identification information (e.g., IMSI) of a target user device to switch from a broadcast mode to a unicast mode into a broadcasting message and transmit the broadcasting message with the inserted identification information. Accordingly, the user device may access a system according to the unicast switch parameter included in the broadcasting message and receive the GPS correction data through transmitter 130.

For another example, the user device may transmit a switch request to GPS correction data service server 100 in order to switch a transmission mode from a broadcasting mode to a unicast mode for transmitting the GPS correction data, and controller 120 may decide to switch the transmission mode of the requested user device to the unicast mode. Such a switch request may be received by receiver 120. After authenticating the user device, controller 120 may switch the transmission mode back to the broadcasting mode. For this, controller 120 may request each user device to transmit a switch request in accordance with at least one embodiment.

When there is need for transmitting the emergency alert message to the predetermined user device, controller 120 may switch a transmission mode from a broadcasting mode to a unicast mode for transmitting a GPS correction data to the predetermined user device. That is, when a predetermined disaster happens, the EAS is triggered to transmit a corresponding emergency alert message (EAM) for warning public (e.g., or a predetermined personnel) of the predetermined disaster. In this case, since the EAM needs to be broadcasted through the EAS (e.g., EAS dedicated channel), the GPS correction data needs to be transmitted to the predetermined user device in a unicast mode. In this case, controller 120 may receive related information (e.g., a target region to broadcast an EAM and a duration time for broadcasting the EMA) from an emergency alert system (e.g., EAS) and switch a transmission mode of transmitting a GPS correction data to a unicast mode for user devices located at a target area based on the related information. In this case, controller 120 may switch the transmission mode of transmitting the GPS correction data to a unicast mode only when the duration time for transmitting the emergency alert message is greater than a threshold time. That is, when the time for transmitting the emergency alert message is shorter than a time period for transmitting the GPS correction data, the transmission mode may not be switched to the unicast mode.

For switching to a unicast mode, controller 120 may transmit a unicast switching request to target user devices individually. Further, controller 120 may insert a unicast switching parameter including identification information of a target user device (e.g., IMSI) into a broadcasting message (e.g., an EAM with a GPS correction data) and transmit the broadcasting message with the unicast switching parameter. When the unicast switching request is transmitted individually, controller 120 may group user devices into a predetermined number of groups, assign a predetermined time delay of about t to each group, and transmit the unicast switching request by each group in turn.

After passing a predetermined duration time for transmitting the emergency alert message, controller 120 may switch back the transmission mode for transmitting a GPS correction data to the broadcasting mode. For this, controller 120 may transmit a switching request to each user device.

Controller 120 may insert an expiration time into the unicast switching parameter to enable a user device to automatically switch back to the broadcasting mode for transmitting a GPS correction data after completely transmitting the emergency alert message. Furthermore, controller 120 may insert an expiration time when the unicast switching request is individually transmitted to a user device. When the expiration time passed, the user device may transmit a switching request to GPS correction data service server 100, and controller 120 may switch a transmission mode of a corresponding user device to the broadcasting mode according to the switching request.

Furthermore, controller 120 may determine an area related to a data traffic processing load smaller than a predetermined threshold i) based on information on the number of user devices accessed to each network devices and ii) based on information on load such as network traffic processing amount and switch a transmission mode to a unicast mode by network devices corresponding to the determined area.

Controller 120 may insert a unicast switching parameter including identification information (e.g., IMSI) of a target user device into a broadcasting message transmitted to the corresponding area and transmit the broadcasting message. When the unicast switching request is individually transmitted, controller 120 may group user devices into a predetermined number of groups and transmit a unicast switching request to each group with a delay time of t by turn. Herein, controller 120 may insert an expiration time into the unicast switching parameter or individually insert an expiration time into a unicast switching request to a user device.

Controller 120 may transmit a specialized or customized GPS correction data to a predetermined user device in accordance with at least one embodiment. In this case, controller 120 may switch the broadcasting mode to the unicast mode for transmitting the GPS correction data. The switching method may be identical to a method for transmitting emergency alert message.

Controller 120 may switch the unicast mode to the broadcast mode when user devices in an area having excessive traffic load are set to receive a GPS correction data using a unicast mode. For this, controller 120 may transmit a transmission mode switching request to each user device.

Transmitter 130 may transmit a GPS correction data using a selected transmission mode between a broadcast mode and a unicast mode in accordance with at least one embodiment. Transmitter 130 may also transmit a switching request to predetermined user device as described above. Transmitter 130 may include a broadcasting module for broadcasting a GPS correction data and a uncasting module for unicast a GPS correction data.

The broadcasting module of transmitter 130 may be cooperated with a cell broadcasting message center (CBMC), which is a broadcasting center for an LTE base station. The broadcasting module of transmitter 130 may include a GPS correction data into an emergency alert message and transmit the emergency alert message to user devices in a target area based on the identification of user devices and a transmission mode of GPS correction data, which are stored in memory 140. The broadcasting module of transmitter 130 may use control resources to transmit the GPS correction data. The broadcasting module of transmitter 130 may encode the GPS correction data for using the control resource and transmit the encoding result to the CBMC. The CBMC may deliver the encoding result to the MME. The MME transmit the correction data using a system information block (SIB). broadcasting module of transmitter 130 may deliver a response to controller 120 according to whether accept/reject or transmission success or failure in a broadcasting equipment.

Furthermore, the broadcasting module of transmitter 130 may cooperate with a broadcast/multicast service center (BMSC) which may be a broadcasting device of LTE base station. The broadcasting module of transmitter 130 may include GPS correction data into a broadcasting message and transmit the broadcasting message to user devices in an area based on the identification of user devices and a transmission mode of GPS correction data, which are stored in memory 140. The broadcasting module of transmitter 130 may use data resources to transmit the GPS correction data. Or, the broadcasting module of transmitter 130 may encode correction data for using the data resource and transmit the encoding result to the BMSC. The BMSC may deliver the encoding result through eNodeB. The broadcasting module of transmitter 130 may deliver a response to controller 120 according to whether accept/reject or transmission success or failure in a broadcasting equipment.

The unicasting module of transmitter 130 may recognize the GPS correction data service server 100 as a typical server. The unicasting module of transmitter 130 may transmit the GPS correction data to user devices in an area decided based on the identification of user devices and a transmission mode of GPS correction data, which are stored in memory 140. The unicasting module of transmitter 130 may transmit a GPS correction data to a user device through a packet data network gateway (PDN-GW) and a base station in case of LTE.

When a user requests a service to GPS correction data service server 100, authentication may be performed through the unicasting module of transmitter 130, and necessary logs may be stored. Unicasting module of transmitter 130 may receive a unicasting switching request from a user device, deliver the unicasting switching request to controller 120, and determine whether it is acceptable or not.

Controller 120 may perform operations for authentication and log. Memory 140 may store information for authenticating user device, a log record of each user device, GPS correction data, mapping information between location and network devices, mapping information of network devices and user devices, and transmission modes of GPS correction data of user devices.

As described, GPS correction data service server 100 may provide a GPS correction data to a user device using one of a unicast mode and a broadcast mode in accordance with at least one embodiment. For the unicast mode, GPS correction data service server 100 may individually transmit a GPS correction data corresponding to a user device and a region of the user device through a typical data channel formed of a packet data network gateway (PDN-GW). For the broadcast mode, GPS correction data service server 100 may broadcast a GPS correction data corresponding to a user device and region of the user device using an emergency alert system (e.g., transmitting an emergency alert message through an emergency alert system dedicated channel). Hereinafter, such an operation of GPS correction data service server 100 will be described with reference to FIG. 3 and FIG. 4.

Figure 3:
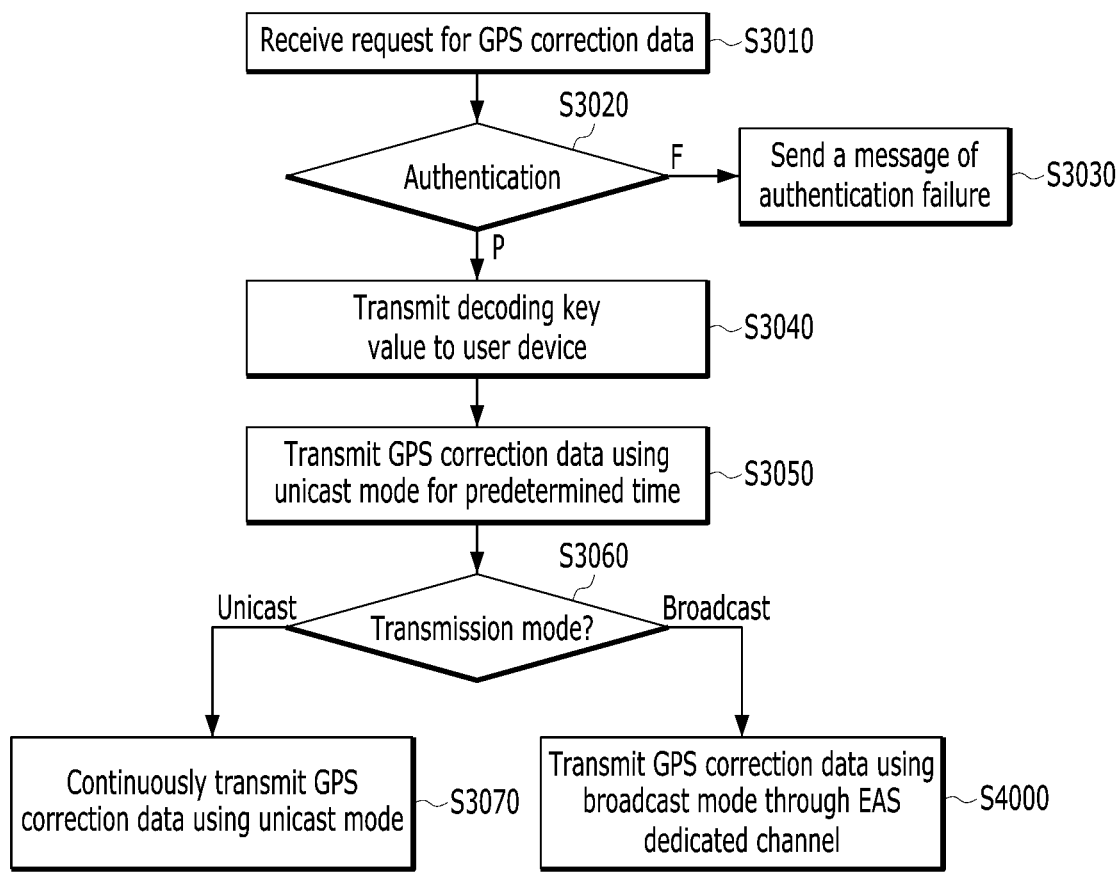
FIG. 3 is a flowchart illustrating a method of a GPS correction data service server for providing a GPS correction data in accordance with at least one embodiment of the present disclosure.

FIG. 3 is a flowchart illustrating a method of a GPS correction data service server for providing a GPS correction data in accordance with at least one embodiment of the present disclosure. Referring to FIG. 3, a request for a GPS correction data may be received at step S3010. For example, GPS correction data service server 100 receives a request for a GPS correction data from user device 100. GPS correction data service serve 100 may retrieve information on user device 200 (e.g., ID of user device 200, a location of user device 200, network devices associated with user device 200) from other entities, such as GPS data server 510, monitoring device 520, and information server 530.

At step S3020, authentication may be performed. GPS correction data service server 100 may authenticate user device 200 using the retrieved information. That is, GPS correction data service server 100 may provide a predetermined interface (e.g., web-site) that allows users to register for a GPS correction data service. Through such interface, users may register at GPS correction data service server 100. During the registration, users may upload information of users including a user device as authentication information. Using this record of a user, GPS correction data service server 100 may perform such authentication process. In accordance with at least one embodiment, such authentication may be performed by communicating with user device 200 through a unicast mode.

When the authentication of the user device is failed (F—S3020), a failure message may be transmitted at step S3030. For example, when requesting user device 200 is not registered at GPS correction data service server 100 for the service, GPS correction data service server 100 denies providing the GPS correction data service and transmits an authentication failure message to user device 200.

When the authentication of the user device is passed (P—S3020), a decoding key value may be transmitted to the user device at step S3040. For example, when requesting user device 200 is registered at GPS correction data service server 100 for the service, GPS correction data service server 100 accepts the request from user device 200, generates a decoding key value, and transmits the generated decoding key value to user device 200.

At step S3050, the requested GPS correction data may be transmitted to the user device using a unicast mode for predetermined time. For example, after transmitting the decoding key value, GPS correction data service server 200 may receive or generate a GPS correction data for user device 200 based on the retrieved information and transmit the GPS correction data to user device 200 through the unicast mode for a predetermined time. As described, in the unicast mode, GPS correction data service server 200 may operate as a typical server communicating with user device 200 through a packet data network gateway (PDN-GW). That is, GPS correction data service server 200 may transmits the GPS correction data through unicast network 410, for example, transmitting the GPS correction data to user device 200 through a data channel formed of a PDN-GW and a corresponding base station.

At step S3060, a transmission mode may be determined after a predetermined time is passed. For example, GPS correction data service server 100 may decide a transmission mode after the predetermined time has passed from transmitting the GPS correction data in the unicast mode. In order to decide, GPS correction data service server 100 may collect necessary information from at least one of memory 140 of GPS correction data service server 100, GPS data server 510, monitoring device 520, and information server 530 and analyze the collected information whether a predetermine condition for switching the transmission mode satisfies or not based on the analysis result. For example, the unicast mode is decided as the transmission mode when environmental conditions meet at least one of unicast mode conditions including i) when authentication is performed, ii) when it needs to transmit an emergency alert message (EAM) to user devices in a certain region for warning public of a disaster (e.g., emergency situation), iii) when GPS correction data service server 100 receives a special request from the predetermined user device, iv) when the number of user devices receiving a GPS correction data service at a specific area reaches a predetermined threshold number, and v) when a network load generates excessively higher than a predetermined threshold. However, embodiments are not limited thereto. Otherwise, the broadcast mode may be selected as the transmission mode for transmitting a GPS correction data to user device 200.

When the transmission mode is determined as a unicast mode (Unicast mode—S3060), the requested GPS correction data may be continuously transmitted to the user device 200 using the unicast mode at step S3070. For example, when environmental conditions satisfy at least one of the above-unicast conditions, correction data service server 100 may unicast the GPS correction data to user device 200 through unicast network 410 (e.g., through the data channel formed of a PDN GW and a base station).

When the transmission mode is determined as a broadcast mode (Broadcast mode—S3060), the requested GPS correction data may be transmitted to the user device using a broadcast mode at step S400. For example, when environmental conditions do not satisfy the above-unicast conditions, correction data service server 100 may broadcast the GPS correction data to user device 200 through broadcast network 420. That is, when the broadcast mode is decided as the transmission mode, GPS correction data service server 100 may transmit the GPS correction data through an EAS. Hereinafter, the operations of GPS correction data service server 100 for transmitting the GPS correction data using the broadcast mode will be described in detail with reference to FIG. 4.

Figure 4:
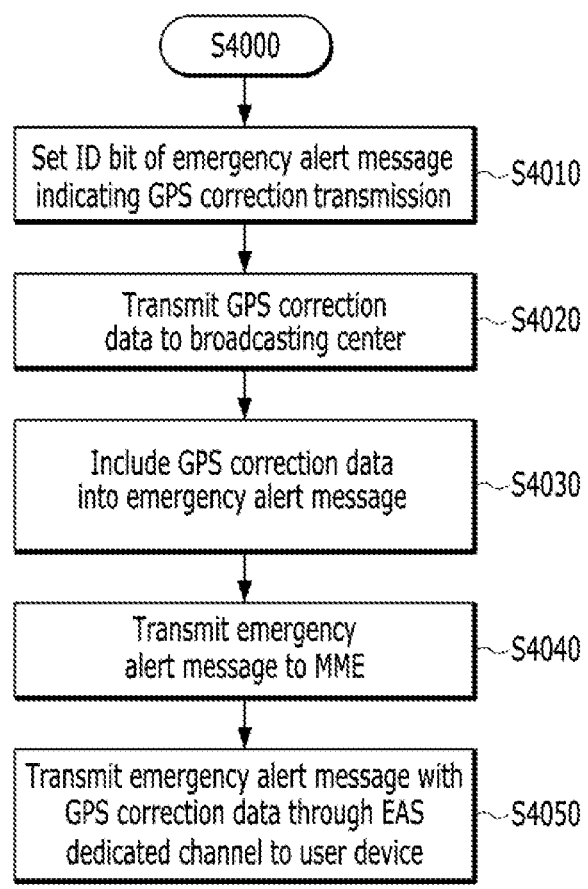
FIG. 4 is a flowchart illustrating a method of a GPS correction data service server for broadcasting a GPS correction data to a user device in accordance with at least one embodiment of the present disclosure.

FIG. 4 is a flowchart illustrating a method of a GPS correction data service server for broadcasting a GPS correction data to a user device in accordance with at least one embodiment of the present disclosure. Referring to FIG. 4, for the broadcast mode, GPS correction data service server 100 may set an identification (ID) bit to a predetermined value indicating GPS correction data transmission S4010 and transmit the requested GPS correction data with the set ID bit to a broadcasting center 300 at step S4020.

At step S4030, broadcasting center 300 may include the requested GPS correction data and the received ID bit into a broadcasting message which has a format similar to or identical to an emergency alert message.

At step S4040, broadcasting center 300 may transmit the emergency alert message to a mobile management entity (MME). For example, broadcasting center 300 may using broadcast network 420 through a dedicated channel allowed for the EAS. In particular, broadcast network 410 may be an EAS network. Broadcast network 410 may be a network formed of a mobile management entity (MME) for broadcasting an emergency alert message through an EAS dedicated channel. For example, broadcast network 410 may be a predetermined dedicated channel formed of a cell broadcasting message center (CBMC) and a MME or a predetermined dedicated channel formed of a broadcast/multicast service center (BMSC).

At step S4050, the MME may transmit the broadcasting message containing the GPS correction data to the user device through an emergency alert system (EAS) dedicated channel.

In FIG. 4, broadcasting center 300 may be illustrated as a representative entity for broadcasting the GPS correction data to the user device. However, embodiments are not limited thereto. As described, as broadcasting center 300, GPS correction data service server 100 may cooperate with a cell broadcasting message center (CBMC) or a broadcast/multicast service center (BMSC). In case of the CBMC, GPS correction data service servers 100 may broadcast a GPS correction data to user devices using control resources. For example, the CBMC may receive a GPS correction data from GPS correction data service server 100, deliver the GPS correction data to the MME and transmit the GPS correction data using a system information block (SIB).

In case of the BMSC, GPS correction data service server 100 may broadcast a GPS correction data to user device using data resources, For example, the BMSC receive GPS correction data from GPS correction data service server 100, encode the received GPS correction data, and transmit the encoded GPS correction data to a user device using a base station (e.g., eNodeB).

The broadcasting module of transmitter 130 may be cooperated with a cell broadcasting message center (CBMC), which is a broadcasting center for an LTE base station. The broadcasting module of transmitter 130 may include a GPS correction data into an emergency alert message and transmit the emergency alert message to user devices in a target area based on the identification of user devices and a transmission mode of GPS correction data, which are stored in memory 140. The broadcasting module of transmitter 130 may use control resources to transmit the GPS correction data. The broadcasting module of transmitter 130 may encode the GPS correction data for using the control resource and transmit the encoding result to the CBMC. The CBMC may deliver the encoding result to the MME. The MME transmit the correction data using a system information block (SIB). broadcasting module of transmitter 130 may deliver a response to controller 120 according to whether accept/reject or transmission success or failure in a broadcasting equipment.

Figure 5:
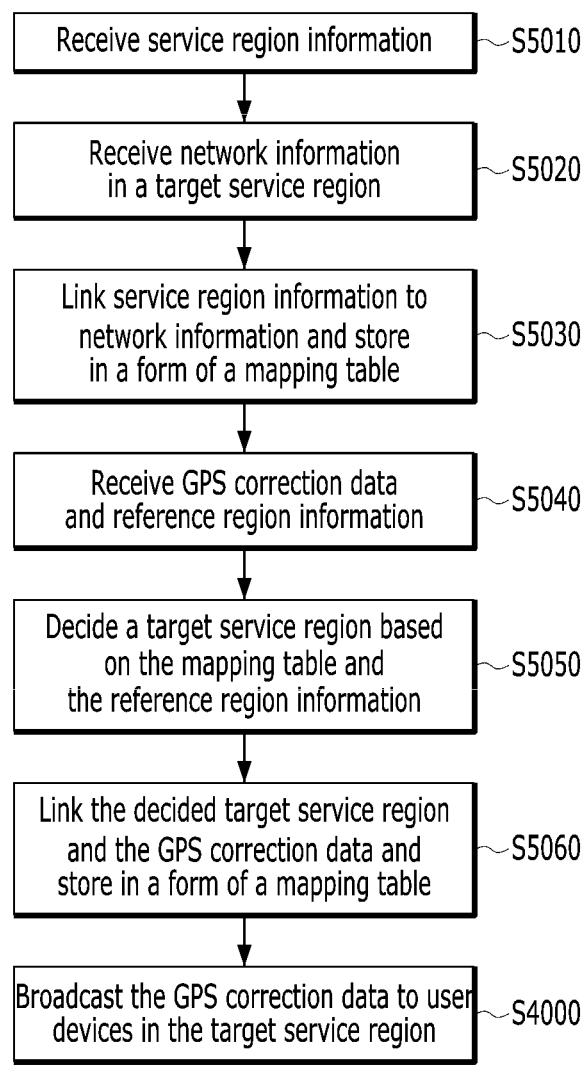
FIG. 5 is a flowchart illustrating a method of a GPS correction data service server for providing a GPS correction data in accordance with another embodiment.

FIG. 5 is a flowchart illustrating a method of a GPS correction data service server for providing a GPS correction data in accordance with another embodiment.

Referring to FIG. 5, GPS correction data service server 100 may receive local information from local information server 130 at step S5010. The local information may include information on a latitude/longitude coordinate and an administrative district.

GPS correction data service server 100 may receive information on network devices from monitoring device 120 at step S5020. In case of wireless network devices, the information on network devices may include i) base station information and ii) user device information. The base station information may include identification (ID) (e.g., eNB of LTE), a tracking area code (TAC), and a coordinate (e.g., latitude/longitude and administrative area) of the base station. The user device information may include identification (e.g., IMSI) of a user device linked to the base station. In case of wired access, the information on network devices may include location information (e.g., latitude/longitude coordinate, administrative district) and identification information (e.g., IP address and MAC address), and user device identification information (e.g., IP address and MAC address).

GPS correction data service server 100 may link the received location information with the received network devices information and store the link result in memory 140 in a form of a mapping table at step S5030. That is, GPS correction data service server 100 may store information which network devices installed at which location and load information of each network devices.

Furthermore, GPS correction data service server 100 may receive GPS correction data and reference location information from GPS correction data generating system 110 at step S5040.

GPS correction data service server 100 may determine a target region to transmit the GPS correction data based on the received reference location information and the matching information of the location information and the network devices information stored in memory 140 at step S5050.

GPS correction data service server 100 may record and store GPS correction data per reference location information and a corresponding target region in memory 140 in a form of a mapping table at step S5060. In accordance with another embodiment, GPS correction data service server 100 may store GPS correction data, target region information, and transmission period of each reference location information in memory 140.

GPS correction data service server 100 may broadcast the GPS correction data to the user devices in the target service region based on the stored information at step S400 (e.g., shown in FIG. 3).

Figure 6:
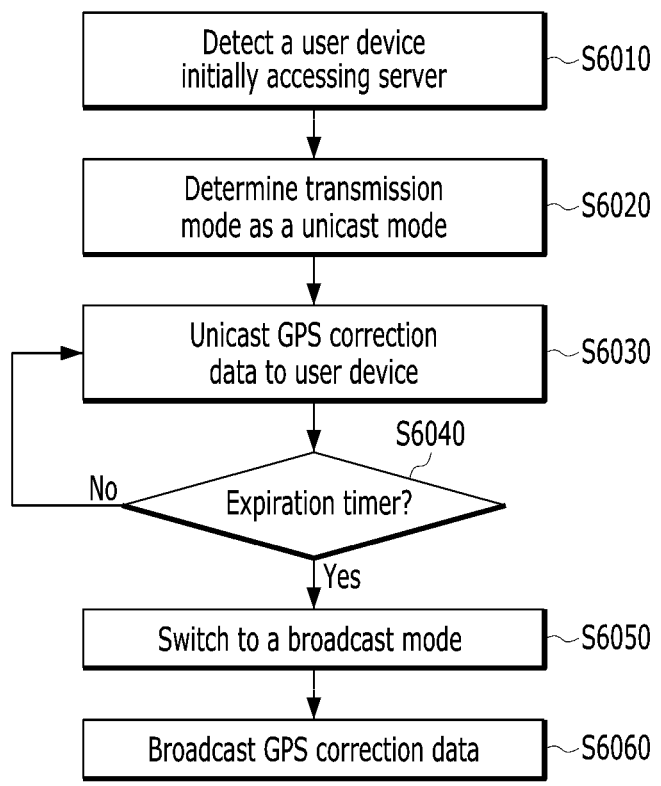
FIG. 6 is a flowchart showing a method of a GPS correction data service server to provide GPS correction data to a user device that initially accesses the server in accordance with at least one embodiment.

FIG. 6 is a flowchart showing a method of a GPS correction data service server to provide GPS correction data to a user device that initially accesses the server in accordance with at least one embodiment;

Referring to FIG. 6, GPS correction data service server 100 may receive an initial service request from user device 200 at step S6010. The initial service request may include an authentication request generated and received when a user device performs an application requiring GPS correction data. The application requiring GPS correction data may be a navigation application and a map application.

Upon receipt of the initial access request, GPS correction data service server 100 may decide a unicast mode as a transmission mode for transmitting the GPS correction data to the user device for a predetermined time at step S6020, and GPS correction data service server 100 may unicast the GPS correction data to the user device at step S6030.

GPS correction data service server 100 may determine whether the predetermined time is expired or not at step S6040. When the predetermined time is not expired (No—S6040), GPS correction data service server 100 may continuously unicast the GPS correction data to the user device through unicast network 410 at step S6030.

When the predetermined time is expired (Yes—S6040), GPS correction data service server 100 may switch the transmission mode from the unicast mode to the broadcast mode at step S6050. Accordingly, GPS correction data service server 100 may broadcast the GPS correction data to the user device at a predetermined time period through EAS dedicated channel of broadcast network 420.

Figure 7:
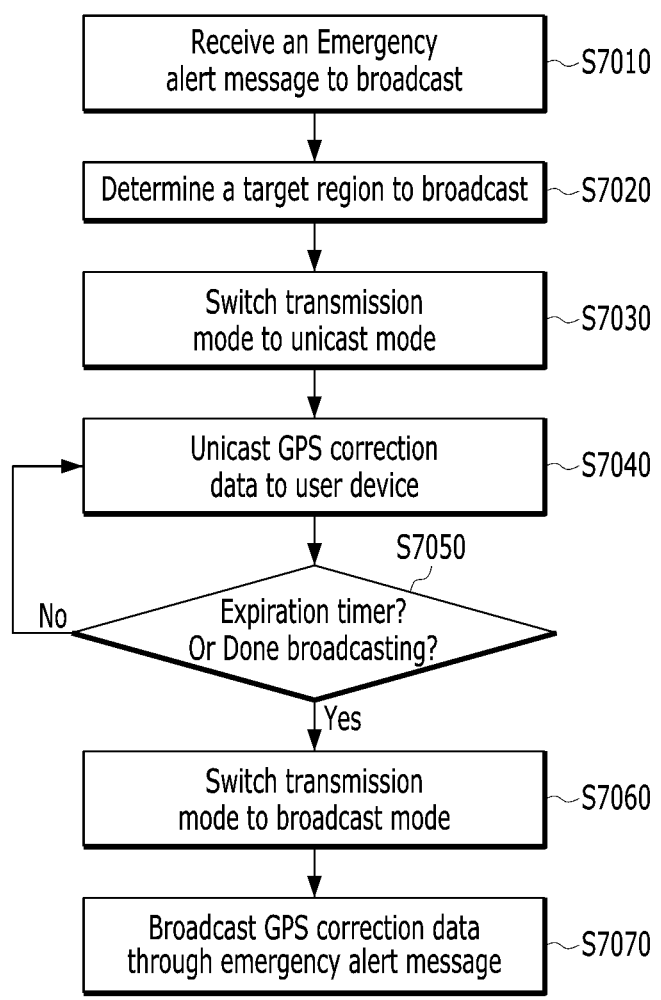
FIG. 7 is a flowchart showing a method for switching a transmission mode for transmitting GPS correction data to a user device from a broadcasting mode to a unicast mode in accordance with at least one embodiment.

FIG. 7 is a flowchart showing a method for switching a transmission mode for transmitting GPS correction data to a user device from a broadcasting mode to a unicast mode in accordance with at least one embodiment;

Referring to FIG. 7, GPS correction data service server 100 may receive information on an emergency alert message to target transmission area and a required time for transmitting the emergency alert message from an entity for transmitting the emergency alert message (e.g., CBMC) at step S7010.

GPS correction data service server 100 may check a target transmission area from the related information at step S7020.

GPS correction data service server 100 may switch the transmission mode for transmitting a GPS correction data to user devices located in the target transmission area from the broadcasting mode to the unicast mode at step S7030. For switching, a unicast switching request message may be individually transmitted to each user device. Or, a broadcasting message including a unicast switching parameter may be broadcasted to the user devices in the target transmission area.

In order to reduce a network load for individually transmitting the unicast switching request to each user device, GPS correction data service server 100 may group the user devices in a predetermined number and transmit the unicast switching request with a time delay of t by each group.

GPS correction data service server 100 may unicast the GPS correction data to the target user device while the emergency alert system broadcasts the requested emergency alert message for the predetermined time at step S7040. GPS correction data service server 100 may keep measuring the time for transmitting the emergency alert message and determine whether the predetermined time is expired or not at step S7050.

When the required time for transmitting the emergency alert message has not passed (No—S7050), GPS correction data service server 100 may continuously unicast the GPS correction data to the target user device and the emergency alert system continuously broadcasts the requested emergency alert message for the predetermined time at step S7040.

When the required time for transmitting the emergency alert message has passed (Yes—S7050), GPS correction data service server 100 may determine the broadcasting of the emergency alert message has done and transmit a transmission mode switching request to the user devices at step S7060. GPS correction data service server 100 may transmit the GPS correction data to the target user device using the broadcast mode through the EAS dedicated channel of broadcast network 420. Accordingly, the target user device may disconnect a direction connection to GPS correction data service server 100 through unicast network 410 and receive the GPS correction data using the broadcast mode through the EAS dedicated channel of broadcast network 420.

As shown in FIG. 7, the transmission mode may be switched to the unicast mode when it is necessary to transmit an emergency alert message with real emergency information. Furthermore, GPS correction data service server 100 may switch the transmission mode to the unicast mode when it is necessary to authenticate the user device. Such switch request may be directly received from the user device that requires the authentication. Further, a unicast switch parameter and a user device identification may be included in the broadcasting message, and the broadcasting message may be transmitted.

Figure 8:
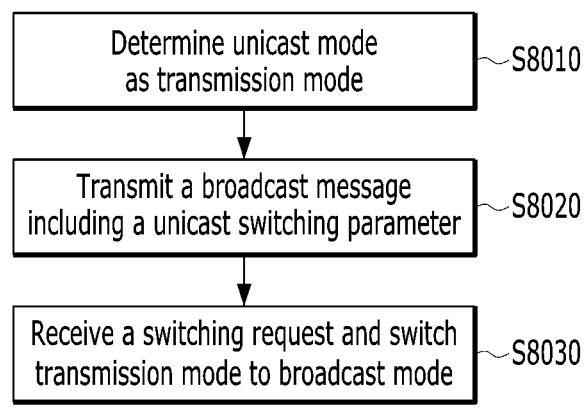
FIG. 8 is a flowchart showing a method for switching a transmission mode for transmitting GPS correction data to a user device from a broadcasting mode to a unicast mode in accordance with another embodiment.

FIG. 8 is a flowchart showing a method for switching a transmission mode for transmitting GPS correction data to a user device from a broadcasting mode to a unicast mode in accordance with another embodiment;

Referring to FIG. 8, GPS correction data service server 100 may decide a transmission mode of a predetermined user device as a unicast mode at step S8010. The transmission mode may be decided as a unicast mode i) when a user device needs to be authenticated, ii) when an emergency alert message needs to be transmitted, iii) when a network load is greater than a predetermined threshold, or iv) when specialized GPS correction data needs to be transmitted.

For switching the transmission mode, GPS correction data service server 100 may include a unicast switching parameter having an expiration time and an identification of the predetermined user device in a broadcasting message and transmit the broadcasting message at step S8020. Accordingly, the predetermined user device may request GPS correction data service server 100 to receive the GPS correction data in the unicast mode. For switching the transmission mode, the user device may transmit a switching request to receive the GPS correction data in the broadcasting mode when the expiration time passed. GPS correction data service server 100 may receive a switching request from the predetermined user device when the expiration time passed and switch the transmission mode from the unicast mode to the broadcasting mode of the predetermined user device based on the switching request from the predetermined user device at step S8030.

Figure 9:
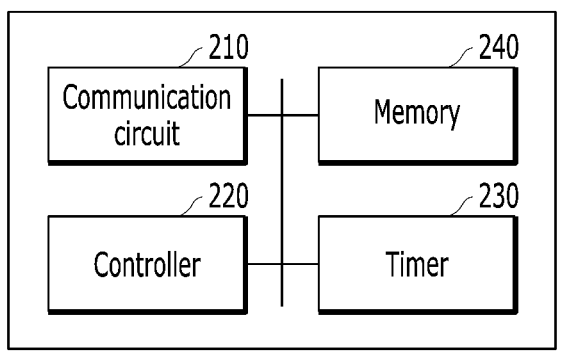
FIG. 9 is a diagram illustrating a user device in accordance with at least one embodiment.

FIG. 9 is a diagram illustrating a user device in accordance with at least one embodiment. Referring to FIG. 9, user device 200 may be a personal computing device capable of receiving digital data from other entities through a predetermined communication network, transmitting digital data to other entities through a predetermined communication network, processing the digital data to perform operations for receiving GPS correction data from GPS correction data service server 100 using one of a broadcast mode and a unicast mode by cooperating with other computing and communication systems, and storing digital data in a memory. As described, user device 200 may be a portable electronic device capable of communication and performing positioning functions, such as a map function or a navigation function, such as a smart phone, a tablet, and a laptop computer.

User device 200 may include communication circuit 210, controller 220, timer 230, and memory 240. That is, user device 200 may include a memory, a memory controller, at least one processor (e.g., central processing unit: CPU), peripheral interfaces, input/output (I/O) subsystems, display device, an input device, and a communication circuit.

Communication circuit 210 may communicate with other entities including GPS correction data service server 100 through a communication network including unicast network 410 and broadcast network 420. Communication circuit 210 may include at least one module (or at least one circuit) for communicating with other entities through a communication network. Herein, the communication network may include a variety of communication networks such as a wireless communication network and a wired communication network. For example, the communication network may include a wideband code division multiple access (WCDMA) network, a microwave access (WiMAX) network, a wireless fidelity (WiFi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

In particular, communication circuit 210 may include i) a GPS receiver that receives GPS information from at least one satellite and ii) a GPS correction data receiver that receives GPS correction data. Communication circuit 210 may perform communication through a RF signal. Communication circuit 210 may convert a RF signal to a digital signal (e.g., electric signal) or a digital signal to a RF signal and transmit the converted signal through a communication network. Communication circuit 210 may include an antenna system, a RF transceiver, at least one of amplifiers, a tuner, at least one of oscillators, a digital signal processor, a CODEC chipset, a subscriber identity module (SIM) card, and a dedicated memory.

Controller 220 may perform or control overall operation of user device 200. For example, controller 220 may be a central processing circuitry that controls constituent elements (e.g., memory, communication circuit, etc.) of user device 200 and/or performs a variety of operations (or functions) of user device 200. Controller 220 may be at least one of processors. Controller 220 may perform operations for receiving a GPS correction data from GPS correction data service server 100 through one of a unicast mode and a broadcast mode.

Memory 230 may store a variety of information, such as software programs for operation, data received from other entities, and data generated as result of operations. That is, memory 230 may store an operation system data, applications, and related data, received from other entities through a variety of communication media (e.g., communication networks). Memory 230 may include at least one of an internal memory and an external memory according to embodiments. For example, memory 140 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Timer 230 may measure a time for switching a transmission mode from a broadcast mode to a unicast mode or from a unicast mode to a broadcast mode in response to control of controller 220.

Hereinafter, operation of user device 200 will be described in more detail with reference to FIG. 10.

Figure 10:
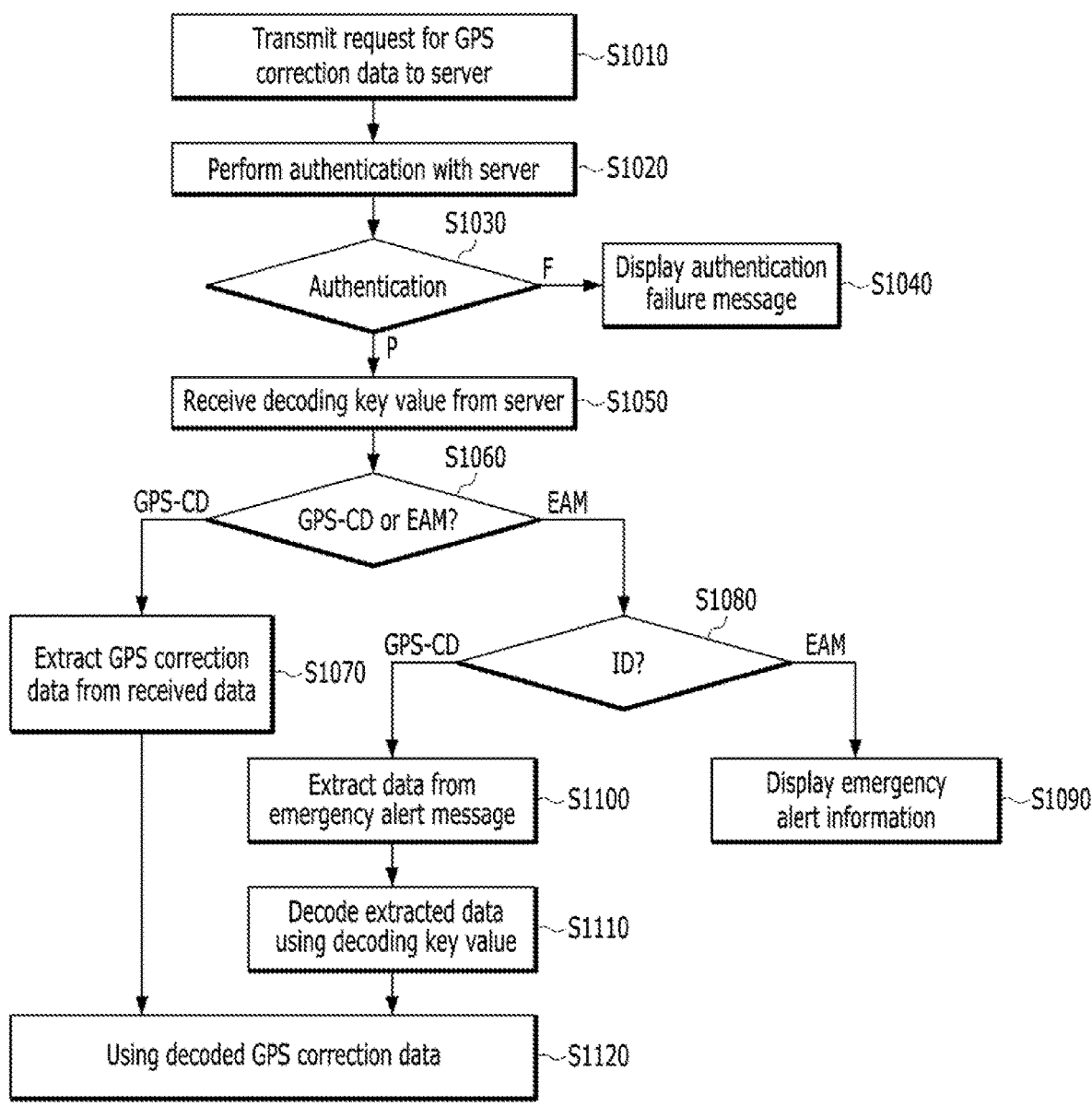
FIG. 10 is a flowchart showing a method of a user device for receiving a GPS correction data in accordance with at least one embodiment.

FIG. 10 is a flowchart showing a method of a user device for receiving a GPS correction data in accordance with at least one embodiment. Referring to FIG. 10, a request for GPS correction data may be transmitted to GPS correction data service server 100 at step S1010. For example, user device 200 may invoke a map application or a navigation application in response to a user input through a predetermined interface. Such a predetermined interface may be a graphic user interface (e.g., default home screen) of the map application or the navigation application, which is displayed on a screen of user device 200 when the map application or the navigation application is selected and executed in response to a user input. In this case, user device 200 may generate a request message containing ID, authentication information, application information, and user device information, so forth and transmit the request message to GPS correction data service server 100. For initially accessing GPS correction data service server 100, user device 200 may communicate with GPS correction data service server 100 similar to communication with a typical server, for example, a unicast mode.

At step S1020, authentication may be performed with GPS correction data service server 100. For example, user device 200 may be authenticated by GPS correction data service server 100 using information in the request message and information (e.g., registration information) stored or collected by GPS correction data service server 100 for authentication. That is, GPS correction data service server 100 may provide a predetermined interface (e.g., web-site) that allows users to register for a GPS correction data service. Through such interface, user device 200 may register at GPS correction data service server 100. During the registration, user device 200 may upload information of user device 200 as authentication information. Using this record of a user, GPS correction data service server 100 may perform such authentication process in cooperation with user device 200.

When the authentication is failed (F—S1030), an authentication failure message may be received from GPS correction data service server 100 and an authentication failure message may be displayed on predetermined display to a user at step S1040. For example, when user device 200 is not registered at GPS correction data service server 100 for the service, GPS correction data service server 100 rejects providing the GPS correction data service and transmits an authentication failure message to user device 200. In this case, user device 200 receives the authentication failure message.

When the authentication is passed (P—S1030), a decoding key value may be received at step S1050. For example, when requesting user device 200 is registered at GPS correction data service server 100 for the service, GPS correction data service server 100 accepts the request from user device 200. In this case, user device 200 receives a decoding key value from GPS correction data service server 100. Furthermore, user device 200 may receive the requested GPS correction data using a unicast mode (through unicast network) for a predetermined time duration.

When data may be received after receiving the decoding key value, determination may be made whether the received data is a GPS correction data or an emergency alert message at step S1060. For example, when user device 200 receives data, user device 200 may determine the received data is a GPS correction data or an emergency alert message.

When the received data is the GPS correction data (GPS—S1060), user device 200 may extract GPS correction data from the received data at step S1070, and user device 200 may use the extracted GPS correction data to provide a related service to a user at step S1120.

When the received data is the emergency alert message (EAM—S1060), user device 200 may determine whether an ID bit of the received emergency alert message indicates GPS correction data transmission or not at step S1080.

When the ID bit indicates an emergency alert message (EAM—S1080), user device 200 may extract emergence alert information from the emergency alert message and display the emergency alert information through at least one display at step S1110.

When the ID bit indicates GPS correction data transmission (GPS transmission—S1080), user device 200 may extract the GPS correction data from the emergency alert message (e.g., a broadcasting message) at step S1090. User device 200 may encode the extracted GPS correction data using the decoding key received from GPS correction data service server 100 at step S1100.

Then, user device 200 may use the decoded GPS correction data to provide a relate service to a user at step S1120.

As described, the GPS correction data may be broadcasted to a user device through an emergency alert system (EAS) dedicated channel in accordance with at least one embodiment. Accordingly, the GPS correction data may be broadcasted to user devices without consuming additional network resources.

Furthermore, a transmission mode for transmitting the GPS correction data may be dynamically switched from a unicast mode to a broadcast mode or from a broadcast mode to a unicast mode according to environmental factors (e.g., region, traffic load, and likes) in accordance with at least one embodiment. Accordingly, the GPS correction data may be provided without delay efficiently using limited network resources.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for transmitting a global positioning system (GPS) correction data to a user device through a mobile communication network, the apparatus comprising:
   a receiver configured to receive a GPS correction data and store in a memory;
   at least one processor configured to decide a transmission mode from a unicast mode and a broadcast mode for transmitting the GPS correction data to a user device;
   a transmitter configured to transmit the GPS correction data to the user device using the decided transmission mode through the mobile communication network,
   wherein the at least one processor is configured to transmit a unicast switching request including an expiration time to user devices decided to be switched from a broadcast mode to a unicast mode as a transmission mode for transmitting a GPS correction data.

2. The apparatus of claim 1, wherein:
   the receiver is configured to i) receive reference region information related to the GPS correction data, where the reference region information is information on a reference region of the GPS correction data and ii) receive network device information related to the reference region information and store the received network device information in the device; and
   the at least one processor configured to a) map the received reference region information with the received network device information and store the mapping result in the memory as a form of a mapping table and b) determine a target transmission region to transmit the GPS correction information using the liking results.

3. The apparatus of claim 2, wherein the at least one processor is configured to identify a region having network devices having a network load smaller than a predetermined threshold and select the unicast mode as the transmission mode for transmitting the GPS correction data to user devices in the identified region.

4. The apparatus of claim 3, wherein the at least one processor is configured to insert a unicast switching parameter in a broadcasting message transmitted to the user devices of the identified region having the network load smaller than the predetermined threshold.

5. The apparatus of claim 3, wherein the at least one processor is configured to i) group the user devices in the identified region having the network load smaller than the predetermined threshold into a predetermined number of user device groups and ii) transmit a unicast switching request to user devices of each user device group by turn with a predetermined interval.

6. The apparatus of claim 3, wherein the at least one processor is configured to switch a transmission mode for transmitting a GPS correction data from a unicast mode to a broadcast mode when the network load is greater than the predetermined threshold.

7. The apparatus of claim 2, wherein the at least one processor is configured to switch a unicast mode to a broadcast mode for transmitting a GPS correction data when a predetermined time has passed after unicasting the GPS correction data to a user device that initially accesses the apparatus for requesting the GPS correction data.

8. The apparatus of claim 2, wherein the at least one processor is configured to select a unicast mode as a transmission mode for transmitting a GPS correction data upon receiving a request for transmitting an emergency alert message, the emergence alert message, a target region, and a transmission time from an emergency alert system.

9. The apparatus of claim 8, wherein the at least one processor is configured to select a unicast mode as a transmission mode for a GPS correction data when the transmission time is greater than a predetermined threshold.

10. The apparatus of claim 1, the at least one processor is configured to insert a unicast switching parameter having an expiration time into a broadcasting message transmitted to user devices decided to be switched from a broadcast mode to a unicast mode as a transmission mode for transmitting a GPS correction data.

11. A server for transmitting a global positioning system (GPS) correction data to a user device through a mobile communication network, the server comprising:
a receiver configured to receive a request for a GPS correction data from the user device;
at least one processor configured to decide a transmission mode from a unicast mode and a broadcast mode for transmitting the GPS correction data to the user device;
a transmitter configured to transmit the GPS correction data to the user device using the decided transmission mode through the mobile communication network,
wherein:
the at least one processor is configured to transmit the GPS correction data to a broadcasting center when the broadcast mode is decided as the transmission mode;
the broadcasting center is configured to include the GPS correction data into an emergency alert message, set an identification bit of the emergency alert message to a predetermined value indicating GPS correction data transmission, and transmit the emergency alert message to the user device through an emergency alert system dedicated channel.

12. The server of claim 11, wherein when the broadcast mode is decided as the transmission mode for transmitting the GPS correction data:
the at least one process is configured to transmit the GPS correction data to the user device using an emergency alert message through an emergency alert system dedicated channel.

13. The server of claim 11, wherein the broadcasting center is one of a cell broadcasting message center (CBMC) and a broadcast/multicast service center (BMSC).

14. The server of claim 11, wherein the at least one processor is configured to transmit a decoding key to the user device when the authentication of the user device is passed.

15. The server of claim 11, wherein the at least one processor is configured to transmit the requested correction data to the user device using a unicast network for a predetermined time.

16. A user device for receiving a global positioning system (GPS) correction data from a service server through a mobile communication network, the user device comprising:
a transmitter configured to transmit a request for the GPS correction data to the service server;
at least one processor configured to determine whether a received data is the GPS correction data received through a unicast network or an emergency alert message received through a broadcast network upon receipt of the data;
a receiver configured to receive a decoding key from the service server when the authentication is passed, receive the GPS correction data from the service server through one of the unicast network and the broadcast network,
wherein when the received data is the emergency alert message through the broadcast network, the at least one processor is configured to determine whether an identification bit indicates GPD correction data transmission or Emergency alert message transmission.

17. The user device of claim 16, wherein when the identification bit indicates GPS correction data transmission, the at least one processor is configured to extract data from the emergency alert message, decode the extracted data using a decoding key value, and use the decoded data as the GPS correction data.

* * * * *